US012606673B2

(12) United States Patent
De Sequera et al.

(10) Patent No.: US 12,606,673 B2
(45) Date of Patent: Apr. 21, 2026

(54) PROCESS FOR MANUFACTURING WET STRENGTH RESINS

(71) Applicant: KEMIRA OYJ, Helsinki (FI)

(72) Inventors: Xavier De Sequera, Barcelona (ES); Mehrdad Hesampour, Espoo (FI); Judith Tarazona, Villatuerta (ES)

(73) Assignee: KEMIRA OYJ, Helsinki (FI)

( * ) Notice: Subject to any disclaimer, the term of this patent is extended or adjusted under 35 U.S.C. 154(b) by 843 days.

(21) Appl. No.: 17/920,125

(22) PCT Filed: Apr. 29, 2021

(86) PCT No.: PCT/FI2021/050319

§ 371 (c)(1),
(2) Date: Oct. 20, 2022

(87) PCT Pub. No.: WO2021/219941

PCT Pub. Date: Nov. 4, 2021

(65) Prior Publication Data

US 2023/0203248 A1      Jun. 29, 2023

(30) Foreign Application Priority Data

Apr. 30, 2020      (FI) ..................................... 20205441

(51) Int. Cl.
| | |
|---|---|
| *C08G 73/02* | (2006.01) |
| *B01D 61/02* | (2006.01) |
| *B01D 69/02* | (2006.01) |
| *D21H 17/55* | (2006.01) |
| *D21H 21/20* | (2006.01) |

(52) U.S. Cl.
CPC ....... *C08G 73/0286* (2013.01); *B01D 61/027* (2013.01); *B01D 69/02* (2013.01); *D21H 17/55* (2013.01); *D21H 21/20* (2013.01); *B01D 2325/14* (2013.01)

(58) Field of Classification Search
CPC .. C08G 73/0286; B01D 61/027; B01D 69/02; B01D 2325/14; D21H 17/55; D21H 21/20
See application file for complete search history.

(56) References Cited

U.S. PATENT DOCUMENTS

| | | | |
|---|---|---|---|
| 5,516,885 A | 5/1996 | Gorzynski et al. | |
| 6,056,967 A | 5/2000 | Steuerle | |
| 2001/0034406 A1 * | 10/2001 | Yamamoto | C08G 73/0286 |
| | | | 523/426 |
| 2008/0066881 A1 | 3/2008 | Riehle et al. | |
| 2011/0263814 A1 | 10/2011 | Riehle et al. | |
| 2012/0271008 A1 | 10/2012 | Favors et al. | |

FOREIGN PATENT DOCUMENTS

| | | | |
|---|---|---|---|
| EP | 0442866 B1 | 6/1994 | |
| JP | 2002201266 A | 7/2002 | |
| JP | 2002201267 A | 7/2002 | |
| JP | 2003003395 A | 1/2003 | |
| WO | 9222601 A1 | 12/1992 | |
| WO | 0067994 A1 | 5/1999 | |
| WO | 0034358 A | 6/2000 | |
| WO | WO-0034358 A1 * | 6/2000 | C08G 73/0286 |
| WO | 2000067884 A1 | 11/2000 | |
| WO | 2008036241 A | 2/2008 | |
| WO | 2012145318 A2 | 10/2012 | |

OTHER PUBLICATIONS

International Search Report and Written Opinion in International Application No. PCT/FI2021/050319, mailed Jul. 26, 2021, 12 pages.
Search report from Finnish Patent and Registration Office on corresponding Finnish application 20205441. Dated on Aug. 19, 2020. 2 pages.
English translation of Search report from the State Intellectual Property Office of the People's Republic of China on corresponding Chinese application 2021800317683. Dated Jan. 17, 2024. 3 pages.

* cited by examiner

*Primary Examiner* — Kumar R Bhushan
(74) *Attorney, Agent, or Firm* — Meunier Carlin & Curfman LLC

(57) ABSTRACT

The invention relates to a process for manufacturing wet strength resins, which process comprises a polyamide reactor for amidation, an EHH reactor for epihalohydrin addition, a maturing tank for maturing, a ring-closure and cross-linking reactor for polymerization, and in the process a reaction mixture containing at least EHH and at least polyaminoamide epihalohydrin adduct is manufactured. The process further comprises between the maturing tank and the ring-closure and cross-linking reactor a membrane unit comprising a membrane for dividing the reaction mixture stream from the membrane unit into two streams: a permeate stream comprising un-reacted epihalohydrin and a reject stream comprising EHH/PAIM adduct guided to the ring-closure and cross-linking reactor.

15 Claims, 4 Drawing Sheets

PROCESS FOR MANUFACTURING WET STRENGTH RESINS

CROSS REFERENCE TO RELATED APPLICATIONS

This application is a United States National Phase Patent Application of International Patent Application Number PCT/FI2021/050319, filed on Apr. 29, 2021, which claims the benefit of priority to FI Application No. 20205441, filed Apr. 30, 2020.

TECHNICAL FIELD

In general, present invention relates to processes for manufacturing wet strength resins. More especially the present invention relates to a process for manufacturing wet strength resins according to preamble part of the independent process claim.

BACKGROUND

Wet strength resins are used to manufacture wet strengthened fiber products. Polyaminoamide-epichlorohydrin (PAE) are commonly used in commercial applications of wet strength resin. Typically, PAE resins are classified as second (2G), second and a half (2.5G) and third generation (3G) grades of wet strength resins according to some of their properties. 2G grades contain reduced amounts of toxic reaction by-products, like dichloropropanol (DCP) and chloropropanediol (CPD), all isomers are usually included here. These resins superseded in the 1990's the first-generation resins in Europe. Wet strength resin products containing less than 5000 ppm DCP and CPD on solids can be qualified as 2G resins. 2.5G grades contain similar amounts of by-products as 2G resins, but amount of AOX (absorbable organic halides) has been reduced from 2.5% to 1.0% organic chlorine on solids. Third generation (3G) wet strength resins were developed to meet the most stringent food contact requirements, like tea-bag paper. Typically, the by-product content is below 50 ppm and AOX is 0.1% on solids.

As known from the prior art epihalohydrin is known to impart wet-strength efficacy to polyaminoamides, but also causes the eventual resins to contain large amounts of organic halogen. The most common epihalohydrin in the art is epichlorohydrin, by-products content frequently indicates DCP (dichloropropanol) and CPD (chloropropanediol). Different types of processes for the preparation of a water-soluble, nitrogen-containing, epihalohydrin-based resins are known from prior art. In WO patent application publication 9299601A1 is disclosed a process for the preparation of a water-soluble, nitrogen-containing, epihalohydrin-based resin comprising the step of subjecting the resin to an organic halogen reducing after-treatment, in which the after-treatment comprises contacting the resin with a basic ion-exchanger.

In EP patent application publication 0442866 A1 is disclosed a method for separation and re-use of synthetic water soluble resins by ultrafiltration, in which an aqueous solution of a water soluble synthetic resin selected from the group urea-formaldehyde resins, melamine formaldehyde resins and poly-amidoamine-epichlorohydrin resins is charged to an ultrafiltration membrane unit in which the solution is separated into two solutions, a concentrate which mainly comprises the polymer molecules with high molecular weight, and a permeate, which comprises polymer molecules with low molecular weight, monomers and by-products, said permeate subsequently being recirculated to a polymerization step for repeated polymerization. The membrane is used for producing the final MW (Molecular weight) product.

In JP patent application publication 2002201267 A is disclosed a preparation process of a high-molecular-weight polyamidoamine-epichlorohydrin resin (PAE) concentrate, which process involves three membrane separation steps (UF-NF-RO) and in which the membrane treatment is done on final MW product and by-products are disposed of by incineration.

In WO patent application publication 2000067884 A1 is disclosed a process for the fractionation of water-soluble or water-dispersible synthetic amino-containing polymers by ultrafiltration, wherein the process comprises the following steps: a) continuous passage of the polymer solution or dispersion to an ultrafiltration unit and mixing with retentate recycled from step d) and, if required, with essentially polymer-free aqueous medium, b) separation of the mixture in the ultrafiltration unit into a permeate and a retentate, c) discharge of the permeate from the process, d) discharge of some of the retentate; recycling of the remainder of the retentate to step a), e) passage of the portion of the retentate discharged in step d) into at least one further ultrafiltration unit and treatment by a process having the steps a) to d). The process is mainly intended for polyethyleneimines and halogen-free cross-linkers and applications of final products are retention, drainage and fixation agents.

In US patent application publications 2011/0263814 and 2008/0066881 is disclosed a process for preparing polyamine-epihalohydrin resins having reduced levels of residuals, in which a membrane separation apparatus is charged with an aqueous composition comprising at least one polyamine-epihalohydrin resin and residuals and said aqueous composition is separated into a permeate and a retentate by passing said aqueous composition through a membrane of said membrane separation apparatus. The membrane is used for purifying the final product.

It is known from prior of art to use membranes as a post treatment technology for removing epichlorohydrin by-products, for example 1,3-DCP and 3-MCPD (monochloropropanediol) and overall AOX.

In recent times regulation concerning the amount of toxic by-products in wet strength resins (WSR) have become more stringent e.g. <3500 ppm by-product in WSR or food contact paper requires less than 2 ppb CPD in 1 L water extract from 4 g paper sample. During known WSR manufacturing processes, polyaminoamide backbone is reacted with epichlorohydrin in a batch process. The conversion rate is 80% in the first two hours; however, it takes 21 hours to reduce the concentration of unreacted epichlorohydrin below 100 ppm. The unreacted epichlorohydrin is the main contributor to chlorinated by-products in the final WSR. The long production time reduces capacity and increases costs of product.

An object of the invention is to create a process for manufacturing wet strength resins, in which the disadvantages and problems of prior art are eliminated or at least minimized.

An object of the invention is to create an improved process for manufacturing wet strength resins, in which disadvantages relating to the long production time of the wet strength resins, especially relating to reducing amount of DCP, CPD and/or AOX in PAE resins, are eliminated or at least minimized.

An object of the invention is to provide a process for manufacturing wet strength resins, in which high cycle time reduction removal rate is achieved.

An object of the invention is to provide a process for manufacturing wet strength resins, in which improved reduction of epihalohydrin by-product in finished product is achieved.

SUMMARY

In order to achieve the above-mentioned objects, the process according to the invention is mainly characterized by the features of the characterizing clause of the independent process claim. Advantageous embodiments and features are disclosed in the dependent claims.

According to the invention the process for manufacturing wet strength resins comprises a polyamide reactor for amidation, an EHH reactor for epihalohydrin addition, a maturing tank for maturing, an ring-closure and cross-linking reactor for polymerization, and in the process a reaction mixture containing at least EHH and at least polyaminoamide epihalohydrin adduct is manufactured, wherein that the process further comprises a membrane in a membrane unit between the maturing tank and the ring-closure and cross-linking reactor for dividing the reaction mixture stream from the maturing tank into two streams: a permeate stream comprising un-reacted epihalohydrin and a reject stream comprising polyaminoamide epihalohydrin adduct guided to the ring-closure and cross-linking reactor.

According to an advantageous feature of the invention by the membrane from the reaction mixture remaining EHH (epihalohydrin) is removed to the permeate stream and recycled back to the EHH reactor directly or indirectly via a permeate tank.

According to an advantageous feature of the invention by the membrane the reaction mixture is filtrated by filtration and that high molecular weight components are rejected by the membrane.

According to an advantageous feature of the invention the permeate stream contains higher concentration of epihalohydrin and less amount of EHH/PAIM adduct and the reject stream contains low amounts of epihalohydrin and its by-products, less than 2000 ppm on dry adduct.

According to an advantageous feature of the invention the polyamide reactor is configured to make a polyaminoamide (PAIM) prepolymer by reacting a polyamine with a diacid, that the epihalohydrin reactor is configured to obtain an adduct of epihalohydrin (EHH) with the PAIM, an EHH/PAIM adduct, that the maturing tank is configured to remove un-reacted epichlorohydrin, that the ring-closure and cross-linking reactor is configured to make the final wet strength resin.

According to an advantageous feature of the invention the process comprises a flow connection from the polyamide reactor to the EHH reactor, a flow connection from the EHH reactor to the maturing tank, a flow connection from the maturing tank to the ring-closure and cross-linking reactor.

According to an advantageous feature of the invention the process comprises a storage tank at end of the process the final wet strength resin and a flow connection from the ring-closure and cross-linking reactor to the storage tank.

According to an advantageous feature of the invention the process comprises an additional flow connection and a heat exchanger and the additional flow connection from the maturing tank passes through the heat exchanger to the maturing tank and is configured to control temperature of the maturing tank. Advantageously the temperature in the maturing tank is 10-60 deg C.

According to an advantageous feature of the invention the process comprises a process water flow connection to the maturing tank configured to control solids content in the maturing tank. By adding process water into the reaction mixture in the maturing tank the solids level is advantageously controlled to be substantially equal to the starting solids content, which is advantageously 15-30%. Additionally, the process water flow can be utilized to replace water loss due to the permeate flow.

According to an advantageous feature of the invention the membrane is made of ceramic and/or organic and/or inorganic and/or metallic material.

According to an advantageous feature of the invention the membrane has pore size smaller than 1 μm. Advantageously the pore size is 9E–3 to 7 e–3 μm, more advantageously 9E–5 to 7 e–3 μm. The pore size of the membrane is advantageously 100-1500 Da (Daltons). Advantageously, membrane with high permeability, advantageously 0.1-10 $L/(h \cdot m^2 \cdot bar)$ to increase reduction rate.

According to an advantageous feature of the invention operating pressure of the membrane is 5-20 bar.

According to an advantageous feature of the invention operating temperature of the membrane is 10-60 deg C.

According to an advantageous feature of the invention operating pH of process is between 6-10.

According to an advantageous feature of the invention surface charge of the membrane is negative.

According to an advantageous feature of the invention solids content in the beginning of the maturing is 15-55%.

According to an advantageous feature of the invention the membrane in the membrane unit is cleaned advantageously by sulfuric acid solution at 2-4% w/w concentration after each cycle using high crossflow 0.02-10 m/s.

According to an advantageous feature of the invention in the process in the polyamide reactor for making a polyaminoamide prepolymer by reacting an alkyleneamine with a diacid is made, in the EHH reactor an adduct of epihalohydrin with the polyaminoamide prepolymer is obtained and in the membrane unit un-reacted epihalohydrin is removed and in the ring-closure and cross-linking reactor final wet strength resin is made.

According to an advantageous feature of the invention the permeate stream comprises at least 1000 ppm of un-reacted epihalohydrin and the reject i.e. the retentate stream comprises at least 10-30% solids of the EHH/PAIM adduct.

According to an advantageous aspect of the invention in the process for manufacturing wet strength resins the membrane is used to reduce batch time. Thus, instead of waiting for the reaction of polyaminoamide backbone reacting with epihalohydrin (EHH) to be completed, remaining EHH (epihalohydrin) is removed from the reaction mixture and can be recycled back in the process directly or indirectly via an intermediate tank (a permeate tank). In the process, stream from the maturation reactor is filtrated through a membrane by nanofiltration, which membrane divides inlet stream into two streams, permeate and reject streams. The stream that goes through membrane, called permeate, contains higher concentration of epihalohydrin and less amount of EHH/PAIM adduct (i.e. high molecular weight components are rejected by membrane). This permeate can recycled back to the epihalohydrin reactor directly or indirectly via an intermediate tank (a permeate tank). The other stream (reject) is pumped to next maturing tank followed by ring-closure and cross-linking reactor. The retentate i.e., the reject stream is thermally treated to effect ring closure and crosslinking to form a water soluble, nitrogen containing epihalohydrin based wet strength resin. The wet strength resin is typically stabilized with acid.

By the process according to the invention many advantages are achieved: production time is significantly shorter and thus, production capacity is increased, and costs of production are reduced due to reduced batch time in WSR manufacturing process using membrane technology. Additionally, an improved decrease of epihalohydrin by-product in finished product is achieved. The cycle time reduction removal rate is even 73% or more and thus significant reduction of epihalohydrin by-product in finished product is achieved. Further additionally, in the process for producing wet strength resins, especially amount of DCP, CPD and/or AOX in PAE resins i.e. the amount of the epihalohydrin by-products is reduced without need to subject the reaction mixture to alkali or acid treatment.

BRIEF DESCRIPTION OF THE DRAWINGS

In the following the invention is explained in detail with reference to the accompanying drawing to which the invention is not to be narrowly limited.

DETAILED DESCRIPTION

During the course of the following description like numbers and signs will be used to identify like elements according to the different views which illustrate the invention and its advantageous examples. In the figures some repetitive reference signs have been omitted for clarity reasons.

Figures 1, 2:
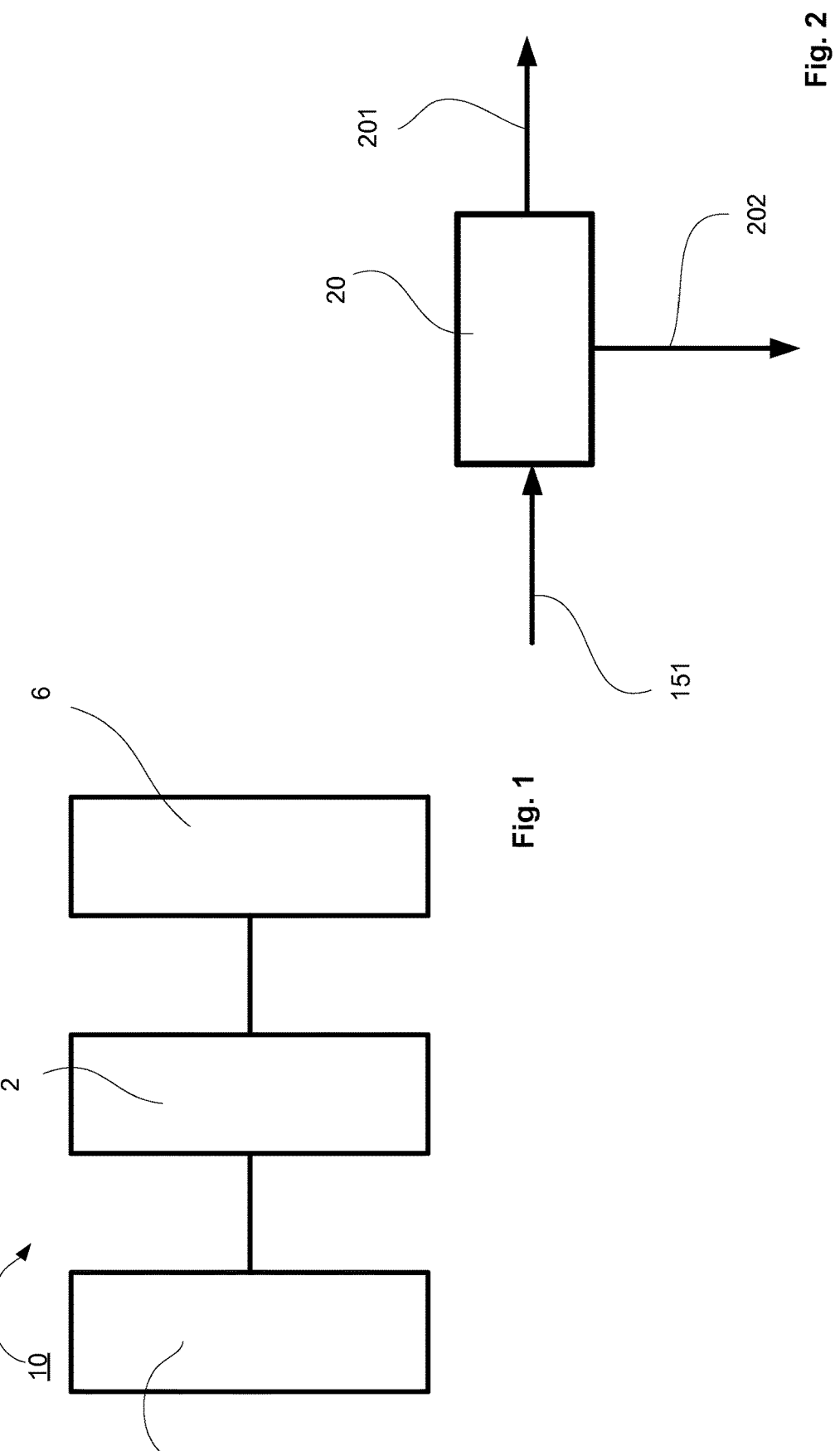
In FIG. 1 is schematically shown an advantageous example of main steps of a process for manufacturing wet strength resins.
In FIG. 2 is schematically shown an advantageous example of a membrane step of a process for manufacturing wet strength resins in accordance with the invention.

In FIG. 1 is schematically shown an advantageous example of main steps of a process for manufacturing wet strength resins. The process 10 comprises an amidation step 1, an EHH (epihalohydrin) addition step 2 and a polymerization step 6.

The amidation step 11 comprises loading of raw materials and salt formation to a polyamide reactor 11 (FIG. 3), in which the polyamide reactor 11 is loaded with the amines. Typically, adipic acid is added on top of the amines in the polyamide reactor 11 resulting in heat generation due to a neutralization reaction: $R_1$—$NH_2$+$R_2$—COOH→$R_1$—$NH_3^+$+$R_2$—COO$^-$+heat. Thereafter follows the amide formation and water removal, during which the polyamide reactor 11 is heated causing the reaction mixture to reach its boiling point and water evaporates, which evaporated water is condensed and collected. As the amidation step is an equilibrium reaction, it can be shifted to the right by heating: $R_1$—$NH_3^+$+$R_2$—COO$^-$+heat→$R_1$—NH—CO—$R_2$+$H_2O$. After target values of the process is reached and final reaction boiling point temperature is reached cold water is added to the reactor to cool down and dilute the resulting polyaminoamide to target solids value.

Figure 3:
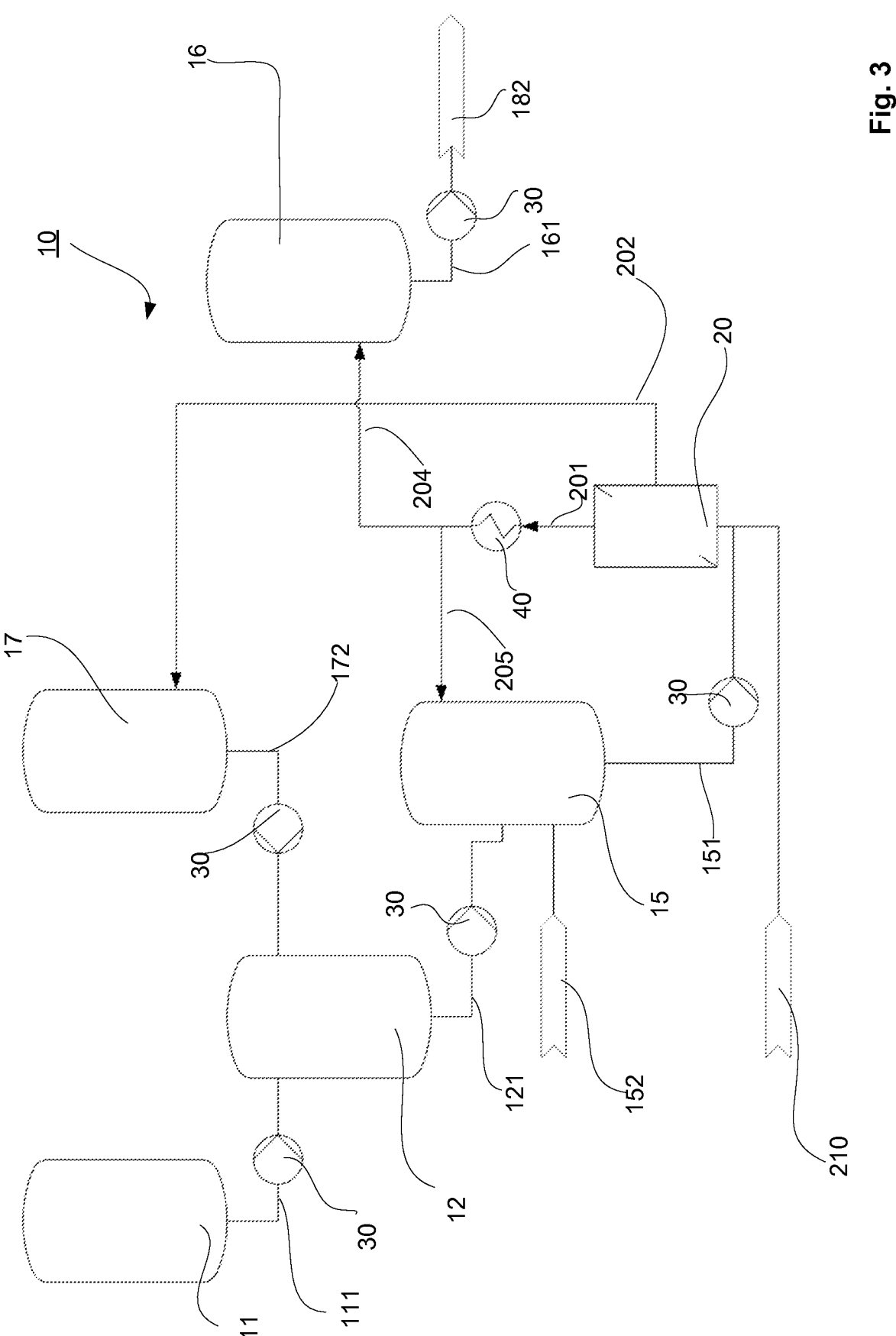
In FIG. 3 is schematically shown another advantageous example of a process for manufacturing wet strength resins in accordance with the invention.

The EHH (epihalohydrin) addition step 2 comprises polyamide cooling and reaction, in which the polyaminoamide is transferred from the polyamide reactor 11 to an EHH reactor 12 (FIG. 3). The polyamide is diluted to target value solids and cooled down to desired temperature. Epihalohydrin amount for the batch is added to the EHH reactor 12 in one or more portions over 1 hour. Epihalohydrin amount reacts exothermally with the free amines in polyaminoamide in set temperature, which can be controlled for example by circulating the reaction mixture through a heat exchanger. In post-reaction of maturing in a maturing tank 15 (FIG. 3) epihalohydrin reaction with the polyaminoamide:

R—NH—R+$CH_2$(O)CH—$CH_2$X→$R_2$N—$CH_2$—CHOH—$CH_2$X+heat, which reaction is fast at the beginning but it slows down as concentration of both reactants diminishes. (In prior art systems the conversion after the first 2 hours is 80% and in prior art processes reduction of unreacted epihalohydrin concentration below 1000 ppm takes 21 hours.)

The epihalohydrin polyaminoamide reaction is performed at 2-60 deg C. and at solids concentration 10-70%. The intermediate PAIM/EHH adduct is cooled below 30 deg C. and has a viscosity in the range 10-1000 mPa·s at 20 deg C.

The resins according to the present invention are preferably obtained by subjecting the intermediate adduct to circulation through a membrane unit to remove the unreacted epihalohydrin and halogen containing by-products.

The ring closure and cross-linking reaction is carried out in such a way the end product has a viscosity 100-250 mPa·s at 20 deg C. and 20-30% solids. The resulting molecular weight is in the range 100-1000 kDa.

The final pH is set to 2.5-4.5 applying any feasible inorganic or organic acid, whereas the preferred inorganic acids include sulfuric and phosphoric acid and the preferred organic acids are formic and citric acids.

The maturing tank 15 as shown in FIG. 3 is connected to a membrane unit 20 for separating the not reacted EHH from the reaction mixture before the polymerization step 6 in a ring-closure and cross-linking reactor 16.

The polymerization step 6 comprises ring-closure, in which the material in the ring-closure and cross-linking reactor 16 is diluted to target value solids and heated slowly to determined temperature to convert the halohydrin into azetidinolium halide. That is an endothermal cyclization reaction: $R_2$N—$CH_2$—CHOH—$CH_2$X+heat→$R_2N^+$($CH_2$CHOHCH$_2$)X$^-$ When conductivity stops progressing, heating continues up to cross-link the polymer. At the determined temperature conductivity stabilizes and heating continues to cross-link the polymer. Polymer molecular weight increases as reactive azetidinolium halide reacts with tertiary amines to form intermolecular quaternary ammonium links: $R_2N^+$($CH_2$CHOHCH$_2$)X$^-$+$R_2$N—$CH_2$—CHOH—$CH_2$X+heat→$R_2$N—$CH_2$—CHOH—$CH_2$—$R_2N^+$—$CH_2$—CHOH—$CH_2$XX$^-$ The reaction is allowed to proceed until desired viscosity target value is reached. There after cross-linking is quenched by cooling and pH reduction. Both sulfuric acid and formic acid can used for this purpose. And final solids are adjusted to desired value.

As can be seen from the example of FIG. 2 the membrane unit 20 has an input of PAIM/EHH adduct with not reacted EHH, which is fed to the membrane unit 20 and the stream is filtrated through the membrane unit 20 by nanofiltration, which membrane unit 20 divides inlet stream into two streams, permeate and reject streams, via the flow connection 202 for the permeate and the flow connection 201 for the reject. The permeate has less than 5% PAIM/EHH adduct and high EHH content and the reject has over 90% PAIM/EHH adduct and low EHH content. The stream that goes through membrane and to the second flow connection 202 from the membrane unit 20, called the permeate, contains higher concentration of epihalohydrin and less amount of polyaminoamide epihalohydrin adduct (i.e. high molecular weight components are rejected by membrane) and is cycled to a permeate tank 17. The other stream (reject) via the first connection 201 from the membrane unit 20 is pumped to the ring-closure and cross-linking reactor 16 or recirculated back to maturing tank 15.

The membrane of the membrane unit 20 is made of ceramic and/or organic and/or inorganic and/or metallic material.

In accordance with the advantageous example of the process schematically shown in FIG. 3 the process 10 comprises a polyamide reactor 11 connected through a flow connection 111 from the polyamide reactor 11 to an EHH reactor 12. The EHH reactor 12 is connected through a flow connection 121 from the EHH reactor 12 to a maturing tank 15. Connected to the maturing tank 15 is a membrane unit 20 with a membrane for filtration of the stream via a flow connection 151 from the maturing tank 15 to the membrane unit 20. From the membrane unit 20 there are two flow connections 201 and 202, retentate and permeate flow connections 201 and 202, one flow connection 201 through a heat exchanger 40 forward to discharge to a ring-closure and cross-linking reactor 16 via the flow connection 204 or to recirculation back to maturing tank 15 via the flow connection 205 and second flow connection 202 to a permeate tank 17. The heat exchanger 40 is used to regulate the temperature of the stream leaving the membrane unit 20.

In the process 10 the stream is filtrated through the membrane of the membrane unit 20 by nanofiltration, which membrane unit 20 divides inlet stream into two streams, permeate and reject streams 201, 202, via the flow connection 202 for the permeate and the flow connection 201 for the reject. The stream that goes through membrane and to the second flow connection 202 from the membrane unit 20, called permeate stream, contains higher concentration of epihalohydrin and less amount of EHH/PAIM adduct (i.e. high molecular weight components are rejected by membrane) and is recycled to the permeate tank 17. The other stream (reject stream) via the first flow connection 201 from the membrane unit 20 is pumped to a ring-closure and cross-linking reactor 16 via the flow connection 204 or to recirculation back to maturing tank 15 via the flow connection 205.

From the ring-closure and cross-linking reactor 16 there is a flow connection 161 to a storage tank 182.

There is also a process water flow connection 152 to the maturing tank 15 for solids control in the maturing tank 15. The cleaning substance, advantageously acidic cleaners, for example sulfuric acid, acetic acid, citric acid, formic acid or hydrochloric acid are flow via the cleaning liquid line 210 to the membrane unit 20, in connection with cleaning to remove deposits/fouling from the membrane.

For cleaning of the membrane in the membrane unit 20 there is a cleaning liquid (sulfuric acid) flow connection 210 to the membrane unit 20. Membrane The membrane is cleaned advantageously by sulfuric acid solution at 2-4% w/w concentration after each cycle using high crossflow, for example 0.01-1 m/s. After cleaning the cleaning solution is recycled at the end of the cleaning process for acidification to ring-closure and cross-linking reactor 16.

The process 10 additionally comprises flow generating means such as transfer and/or recirculation pumps 30 for generating the flows in flow connections, and other additional, not essential equipment and devices for process control, known as such to one skilled in the art.

As can be seen from the examples of the FIGS. 1-3 the process 10 for manufacturing wet strength resins, which advantageously is a batch-type process, comprises the polyamide reactor 11 for amidation, the EHH reactor 12 for epihalohydrin addition, the maturing tank 15 for maturing, a ring-closure and cross-linking reactor 16 for polymerization, and in the process a reaction mixture containing at least EHH and at least EHH/PAIM adduct is manufactured. The process further comprises the membrane unit 20 between the maturing tank 15 and the ring-closure and cross-linking reactor 16 for removing un-reacted epihalohydrin by dividing the reaction mixture stream from the maturing tank 15 into two streams: a permeate stream 202 comprising unreacted epihalohydrin and a reject stream 201 comprising EHH/PAIM adduct guided to the ring-closure and cross-linking reactor 16. By the membrane unit 20 from the reaction mixture remaining EHH (epihalohydrin) is removed to the permeate stream 202 and cycled to the permeate tank 17. By the membrane unit 20 the reaction mixture is filtrated by filtration and high molecular weight components are rejected by the membrane unit 20. The permeate stream 202 contains higher concentration of epihalohydrin and less amount of EHH/PAIM adduct and the reject stream 201 contains low amounts of epihalohydrin and its by-products, less than 1000 ppm on solids step wise ranges. In the batch-type process 10 in the polyamide reactor 11 for making a polyaminoamide prepolymer by reacting alkyleneamine with diacid is made, in the EHH reactor 12 the adduct of epihalohydrin with the polyaminoamide prepolymer is obtained and in the membrane unit 20 the un-reacted epihalohydrin is removed and in the ring-closure and cross-linking reactor 16 the final wet strength resin is made.

The wet strength resins produced in the process according to the invention and/or its advantageous feature are water soluble, nitrogen containing, epihalohydrin based resins, acid stabilized. These resins are also referred as cationic thermosetting resins, generally comprise a nitrogen containing precursor and a halogen containing cross-linker. Epichlorohydrin is the preferred cross-linker amongst other epihalohydrins like epibromohydrin. The preferred nitrogen containing precursor is a polyaminoamide. A typically referred mole ratio epihalohydrin-polyaminoamide basic nitrogen is 1.3-0.7. The preferred polyaminoamide is the reaction product of a polycarboxylic, usually dicarboxylic acid and a polyamine. Suitable polycarboxylic acids include aliphatic, saturated or unsaturated, or aromatic dicarboxylic acids. Preferably, the polycarboxylic acids contain less than 10 carbon atoms. For the purpose of the invention, carboxylic acid derivatives such anhydrides, esters and hemiesters are included. Suitable polycarboxylic acids include glutaric, adipic, azelaic and sebacic acids as well as its mixtures. The preferred polycarboxylic acid is adipic acid. Suitable polyamines include polyalkylene polyamines, or mixtures thereof, satisfying the following formulas:

Preferred polyalkylene polyamines, include diethylenetriamine, triethylenetetramine, tetraethylenepentamine, dipropylenetriamine and mixtures of these amines. These polyamines may well be combined with other polyamines and amines, as well as ω-aminoacids and lactames. Typical polycarboxylic-polyamine ratios 1:0.7 to 1:1.5.

Test Examples

Figure 4:
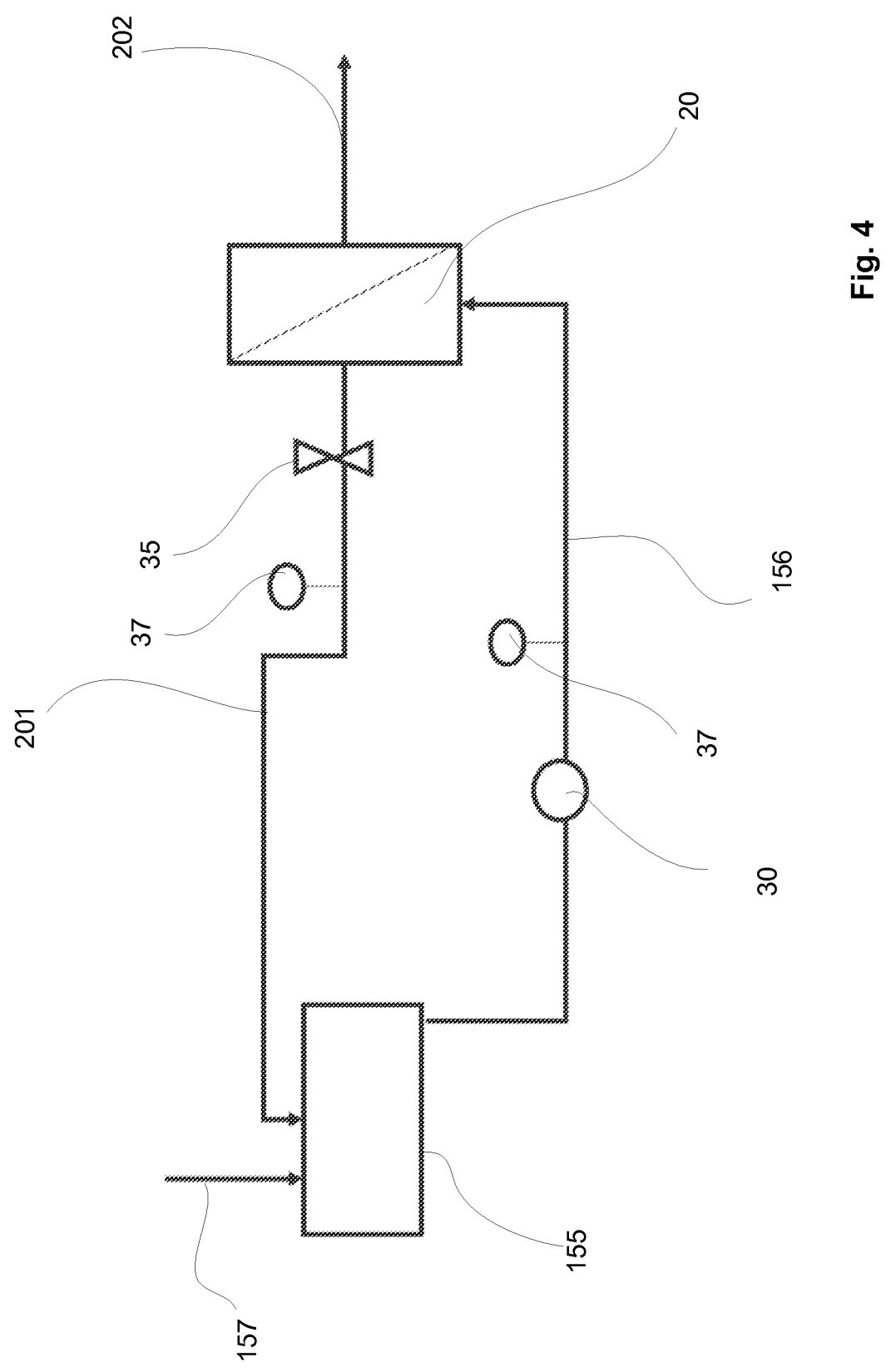
In FIG. 4 schematically shown a flow diagram of a pilot process used in the test examples.

Tests were conducted in small membrane pilot process as shown in FIG. 4. The pilot process comprised a feed tank 155, to which a water connection 157 was provided. The feed tank 155 had a flow connection 156, comprising a pump 30, to a membrane unit 20, from which there was a retentate flow connection 201 via a valve 35 back to the feed tank 155 a permeate flow connection 202. The retentate flow connection 201 and the flow connection from the feed tank to the membrane unit 20 were provided with a pressure gauge 37.

Test Example 1

A polymeric membrane with Cutoff 1500 Da was selected for this test example 1. Mixture with 20 wt % concentration and viscosity of 10-12 mPa·s and EHH concentration of 8000-10000 ppm was added in feed tank 155. Pump 30 started with circulation for about 10 min and then flow in the flow connection 156 was adjusted to 0.07 m/s (780 L/h) and TMP to 10 barq. The retentate was returned via the flow connection 201 to feed tank 155 during experiment. Equal volume of water depleted by permeation through membrane was added in the feed tank 155 via the water connection 157 to keep volume constant during experiments. Temperature in process controlled to range 18-20 degrees C. by using a water jacket around the feed tank 155. Samples for EHH analysis were collected from the feed tank 155, and for permeate from the flow connection 202 during experiments. Those results are compared with control sample (which has not been filtrated). The EHH reduction was calculated from the difference between the retentate and the control sample and were presented as EHH reduction percentage in graph of FIG. 5. The experiment was repeated at 960 and 1140 L/h crossflow and the EHH reduction was reported.

Test example 2: in the second test example, similar approach was used but with a 4000 Da membrane, TMP 4-6 barq and cross flows 780 and 870 L/h.

Test example 3: in the third example, similar approach was used but cross flow was increased to 1140 l/h.

Figure 5:
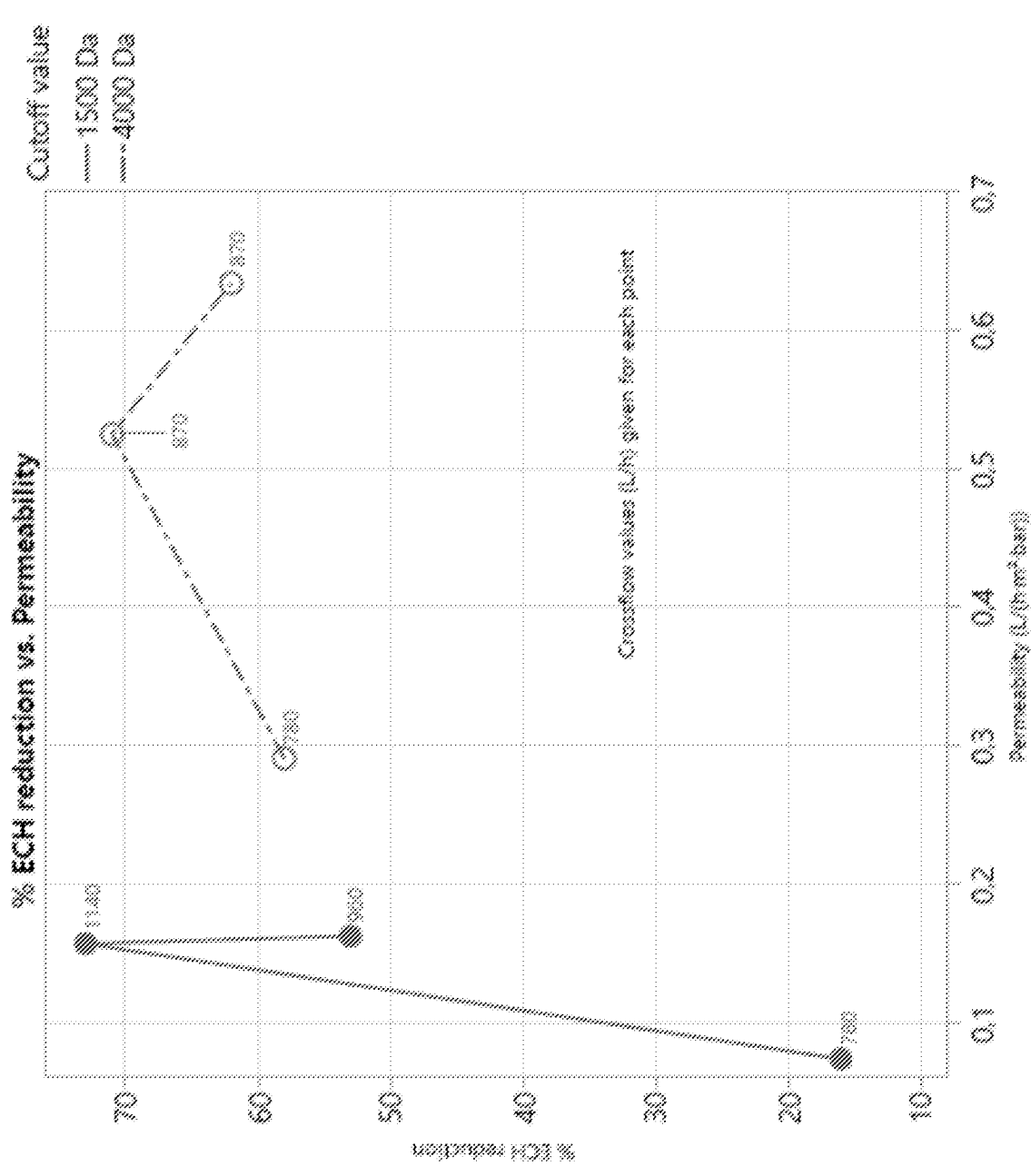
In FIG. 5 is schematically shown test results of tests conducted in the pilot process according to FIG. 4.

Results of the test examples 1-3 is presented in the FIG. 5 as ECH reduction (Y-axis) vs. Permeability (X-axis). As can be seen up to 73% EHH reduction is obtained with the tested membrane.

In the description in the foregoing, although some functions have been described with reference to certain features and examples, those functions may be performable by the other features and examples whether described or not. Although features have been described with reference to the certain examples, those features may also be present in the other examples whether described or not.

Above only some advantageous examples of the inventions have been described to which examples the invention is not to be narrowly limited and many modifications and alterations are possible within the invention as defined in the following claims.

REFERENCE SIGNS USED IN THE DRAWING 1 amidation step
2 EPI addition step
6 polymerization step
10 process
11 polyamide reactor

10

111 flow connection from polyamide reactor to EHH reactor
12 EHH reactor
121 flow connection from EHH reactor to maturing tank
15 maturing tank
151 flow connection from maturing tank to membrane unit
152 process water flow connection
155 feed tank
156 flow connection from feed tank to membrane unit
157 water connection
16 ring-closure and cross-linking reactor
161 flow connection from ring-closure and cross-linking reactor to storage tank
17 permeate tank
182 storage tank
20 membrane unit
201 retentate line i.e. reject flow connection from membrane unit to ring-closure and cross-linking reactor
202 permeated line i.e. permeate flow connection from membrane unit to EHH reactor
204 flow connection to ring-closure and cross-linking reactor
205 flow connection to maturing tank
210 cleaning liquid flow connection to membrane unit
30 pump
35 valve
37 pressure gauge
40 heat-exchanger

The invention claimed is:

1. A process for manufacturing wet strength resins, which process comprises:
a polyamide reactor for amidation,
an EHH reactor for epihalohydrin (EHH) addition,
a maturing tank for maturing,
a ring-closure and cross-linking reactor for polymerization, and
in the process a reaction mixture containing at least EHH and at least polyaminoamide epihalohydrin (EHH/PAIM) adduct is manufactured, and the process further comprises a membrane unit between the maturing tank and the ring closure and cross-linking reactor, the membrane unit comprising a membrane dividing a reaction mixture stream from the membrane unit into a permeate stream and a reject stream, wherein the permeate stream comprises unreacted epihalohydrin and the reject stream comprises EHH/PAIM adduct guided to the ring-closure and cross-linking reactor.

2. The process according to claim 1, wherein by the membrane unit remaining EHH (epihalohydrin) is removed from the reaction mixture to the permeate stream and is recycled back to the EHH reactor directly or indirectly via a permeate tank.

3. The process according to claim 1 wherein by the membrane unit the reaction mixture is filtrated, and wherein toxic and unreacted epihalohydrin components are rejected by the membrane unit.

4. The process according to claim 3, wherein the permeate stream contains higher concentration of epihalohydrin and less amount of polyaminoamide epihalohydrin adduct and the reject stream contains low amounts of epihalohydrin and its by-products, less than 2000 ppm on dry adduct.

5. The process according to claim 1, wherein the polyamide reactor is configured to make a polyaminoamide (PAIM) prepolymer by reacting a polyamine with a diacid, the epihalohydrin reactor is configured to obtain an adduct of epihalohydrin (EHH) with the PAIM, the maturing tank is configured to remove un-reacted epichlorohydrin, and the ring-closure and cross-linking reactor is configured to make a final wet strength resin.

6. The process according to claim 1, wherein the process further comprises a flow connection from the polyamide reactor to the EHH reactor, a flow connection from the EHH reactor to the maturing tank, a flow connection from the maturing tank to the ring-closure and cross-linking reactor.

7. The process according to claim 1, wherein the process comprises a storage tank at end of the process for a final wet strength resin and a flow connection from the ring-closure and cross-linking reactor to the storage tank.

8. The process according to claim 1, wherein the process comprises a heat exchanger and two additional flow connections from the heat exchanger: a discharge to a ring-closure and cross-linking reactor and a discharge to recirculation back to maturing tank.

9. The process according to claim 1, wherein the process comprises a process water flow connection to the maturing tank configured to control solids in the maturing tank.

10. The process according to claim 1, the membrane of the membrane unit is made of ceramic and/or organic and/or inorganic and/or metallic material.

11. The process according to claim 1, wherein in the process in the polyamide reactor a polyaminoamide prepolymer is made by reacting an alkyleneamine with a diacid, in the EHH reactor an adduct of epihalohydrin with the polyaminoamide prepolymer is obtained, and by the membrane unit un-reacted epihalohydrin is removed, and in the ring-closure and cross-linking reactor a final wet strength resin is made.

12. The process according to claim 1, wherein the permeate stream comprises at least 10 000 ppm of the un-reacted epihalohydrin and the reject stream comprises at least 15-30% solids of the EHH/PAIM adduct.

13. The process according to claim 1, wherein operating temperature of the membrane is 15-50 deg C.

14. The process according to claim 1, wherein operating pH of process is between 6-10.

15. The process according to claim 1, wherein surface charge of the membrane is negative.

* * * * *